C. HOOPER.
Tobacco-Hangers.

No. 150,159. Patented April 28, 1874.

Witnesses.

Charles Hooper
by his attorney

UNITED STATES PATENT OFFICE.

CHARLES HOOPER, OF WALPOLE, NEW HAMPSHIRE.

IMPROVEMENT IN TOBACCO-HANGERS.

Specification forming part of Letters Patent No. 150,159, dated April 28, 1874; application filed March 11, 1874.

*To all whom it may concern:*

Be it known that I, CHARLES HOOPER, of Walpole, of the county of Cheshire and State of New Hampshire, have invented a new and useful article, which I term a "Lath for Holding Tobacco or Plants thereof," whether for their transportation from a field to a building or place of deposit, or for supporting them therein during the process of desiccation of them; and I do hereby declare the same to be fully described in the following specification and represented in the accompanying drawings, of which—

Figure 2:
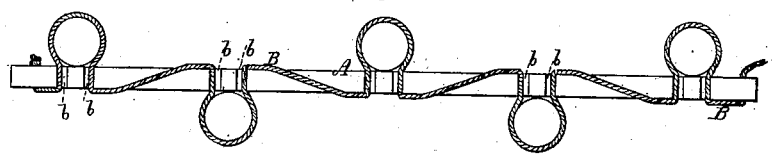
Figure 1:
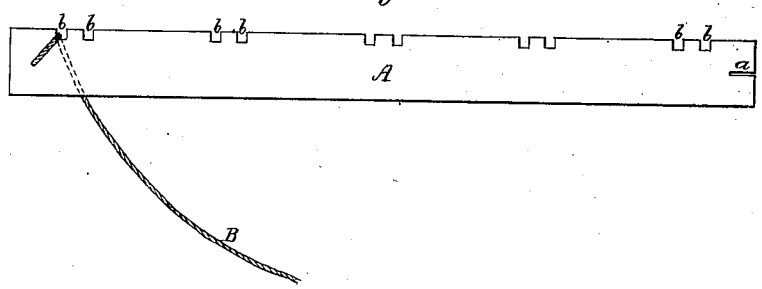

Figure 1 is a side view of the article. Fig. 2 is a top view of it, as applied to several stalks of tobacco.

My invention consists in a long stick or lath, A, provided with a line or twine, B, fastened to it at one end, and also with a hitching kerf or notch, $a$, in the other end, and a series of notches, $b\ b$, arranged in the edge of such stick or lath, all being substantially as represented in the aforesaid drawings.

The plants are to be held to the lath, on opposite sides of it, by the twine wound about them, and carried through the notches, in manner as shown in Fig. 2.

I sometimes substitute a row of pins fixed in the lath for the notches, but prefer the notches, as the pins are liable to get broken or to become detached from the lath by use.

The article, though simple and new, as I believe, has been found to be of great value or utility in supporting the tobacco-plants, which have to be arranged on opposite sides of it, so that it will be properly balanced when placed in a drying-stand, in which the article is to be arranged for the plants to be exposed to the air to effect their desiccation.

The cord or twine, after having been passed through the notches and about the stalks, is to be drawn into the hitching-kerf, which will hold it from becoming loose until it may be desirable to discharge the plants from the lath, which can be done at once by simply withdrawing the cord from the kerf and from the notches.

I claim—

The tobacco-holder, as described, composed of the line B and the lath A, provided with the end and edge notches $a\ b\ b$, all arranged and applied substantially as specified.

CHARLES HOOPER.

Witnesses:
J. G. BELLOWS,
HENRY ALLEN.